United States Patent [19]
Hirasawa et al.

[11] Patent Number: 5,488,414
[45] Date of Patent: Jan. 30, 1996

[54] VIDEO CAMERA APPARATUS HAVING MODE SELECTION DISPLAY ON ELECTRONIC VIEWFINDER SCREEN

[75] Inventors: Masahide Hirasawa, Sagamihara; Kohji Takahashi, Yokohama, both of Japan

[73] Assignee: Canon Kabushiki Kaisha, Tokyo, Japan

[21] Appl. No.: 247,117

[22] Filed: May 20, 1994

Related U.S. Application Data

[63] Continuation of Ser. No. 844,777, Mar. 2, 1992, abandoned.

[30] Foreign Application Priority Data

Mar. 12, 1991 [JP] Japan ................. 3-046564

[51] Int. Cl.⁶ ................................. H04N 5/225
[52] U.S. Cl. ........................... 348/207; 348/334
[58] Field of Search .................... 348/333, 334, 348/207; 354/219, 289.1, 289.12; H04N 5/225

[56] References Cited

U.S. PATENT DOCUMENTS

| | | | |
|---|---|---|---|
| 4,647,176 | 3/1987 | Shimizu et al. | 354/289.1 |
| 5,063,458 | 11/1991 | Fukushima et al. | 358/909 |
| 5,161,025 | 11/1992 | Nakao | 358/224 |

FOREIGN PATENT DOCUMENTS

| | | | |
|---|---|---|---|
| 61-224671 | 10/1986 | Japan . | |
| 62-010971 | 1/1987 | Japan | H04N 5/225 |
| 2048647 | 2/1990 | Japan | H04N 5/225 |
| 3108879 | 5/1991 | Japan | H04N 5/225 |
| 4023574 | 1/1992 | Japan | H04N 5/225 |

Primary Examiner—Wendy R. Greening
Attorney, Agent, or Firm—Fitzpatrick, Cella, Harper & Scinto

[57] ABSTRACT

A video camera apparatus having a plurality of functions including a select switch through which a mode for executing one of various functions is selected, an execute switch through which a particular mode selected through the select switch is executed, and a controller which controls the display of a representation of the selected mode on the electronic viewfinder before the execute switch is operated. Thereafter, when the execute switch is operated, the mode is entered. The controller may include a selection cancelling device for cancelling a previously selected function.

11 Claims, 7 Drawing Sheets

MODE 0   MODE 1   MODE 2   MODE 3   ------   MODE M

VIDEO CAMERA APPARATUS HAVING MODE SELECTION DISPLAY ON ELECTRONIC VIEWFINDER SCREEN

This application is a continuation of application Ser. No. 07/844,777 filed Mar. 2, 1992, now abandoned.

BACKGROUND OF THE INVENTION

1. Field of the Invention

The present invention generally relates to a video camera apparatus, and particularly relates to a mode controller for a video camera or the like.

2. Related Art

In recent years, more and more functions have been attached to video equipment as the use of video equipment demanded by users has diversified, and technologies for achieving high circuit-integration have advanced.

For instance, in the case of a video tape recorder (VTR) integral with a camera, features such as automatic fading and digital title recording, which used to be distinctive functions, are nowadays coming to be functions which are almost always standard. Other functions, such as specification after a fading out or specification of the color of a title, are also available now.

As VTRs have become popular, the chances of editing, etc., by employing a plurality of VTRs have increased. Hence, a camera-integral VTR is demanded to have more additional functions.

When the number of functions offered by a piece of video equipment increases, the number of switches as well as the number of operational procedures of the equipment proportionally increase. As a result, conventional video equipment has the following problems:

(1) Since there are a large number of switches, when an operator taking a picture of a scene wishes to obtain a certain picture effect by using one of the plurality of functions, the operator may find it difficult to operate the correct switch while he sees the scene through the viewfinder.

(2) The switches may have been arranged such that they are provided with particular recesses or protrusions so that the switches can be distinguished from each other by the operator even when he is seeing the scene through the viewfinder. However, the operator may not be able to operate the switches skillfully at the beginning, and, until he is able to do so, he may make errors.

As the size of video equipment becomes smaller, it has become difficult to provide such recesses or protrusions.

(3) If the operator taking a picture wishes to confirm a particular switch he is going to operate, he has to look away from the viewfinder. This involves the risk that the picture being taken may be distorted, or the subject in the scene may be gone.

SUMMARY OF THE INVENTION

The present invention has been made with a view to overcoming the above problems. An object of the present invention is to provide a video camera apparatus in which a switching device is arranged in such a manner as to allow selection and execution of one or more of a plurality of functions to be independently effected through the switching device, and in which the current situation of such selection and execution effected through the switching device is displayed. Thus, the video camera apparatus enables one or more of the functions to be selected and executed with high reliability without any particular need to confirm the position of the switching device.

In order to achieve this end, according to a preferred embodiment of the present invention, there is provided a video camera apparatus having a plurality of functions, the video camera apparatus comprising: function selecting means for selecting at least one of the plurality of functions; function executing means for executing the function selected through the function selecting means; an image monitor for displaying a picture being taken; and control means for displaying a representation of the function selected through the function selecting means on the image monitor prior to the execution of the function through the function executing means.

Another object of the present invention is to provide a mode controller for a video camera apparatus having a plurality of functions, the mode controller allowing one or more of the functions to be selected, executed, and cancelled when necessary while such selection, execution and/or cancellation are always confirmed on the screen of the electronic viewfinder. Thus, the mode controller enables various operations of the video camera apparatus to be reliably performed while preventing erroneous operations and without the need to interrupt an operation of taking a picture.

The above and other objects and features of the present invention will be more apparent upon reading the following descriptions with reference to the accompanying drawings.

DETAILED DESCRIPTION OF THE PREFERRED EMBODIMENTS

Embodiments of the video camera apparatus according to the present invention will now be described with reference to the accompanying drawings.

Figure 1:
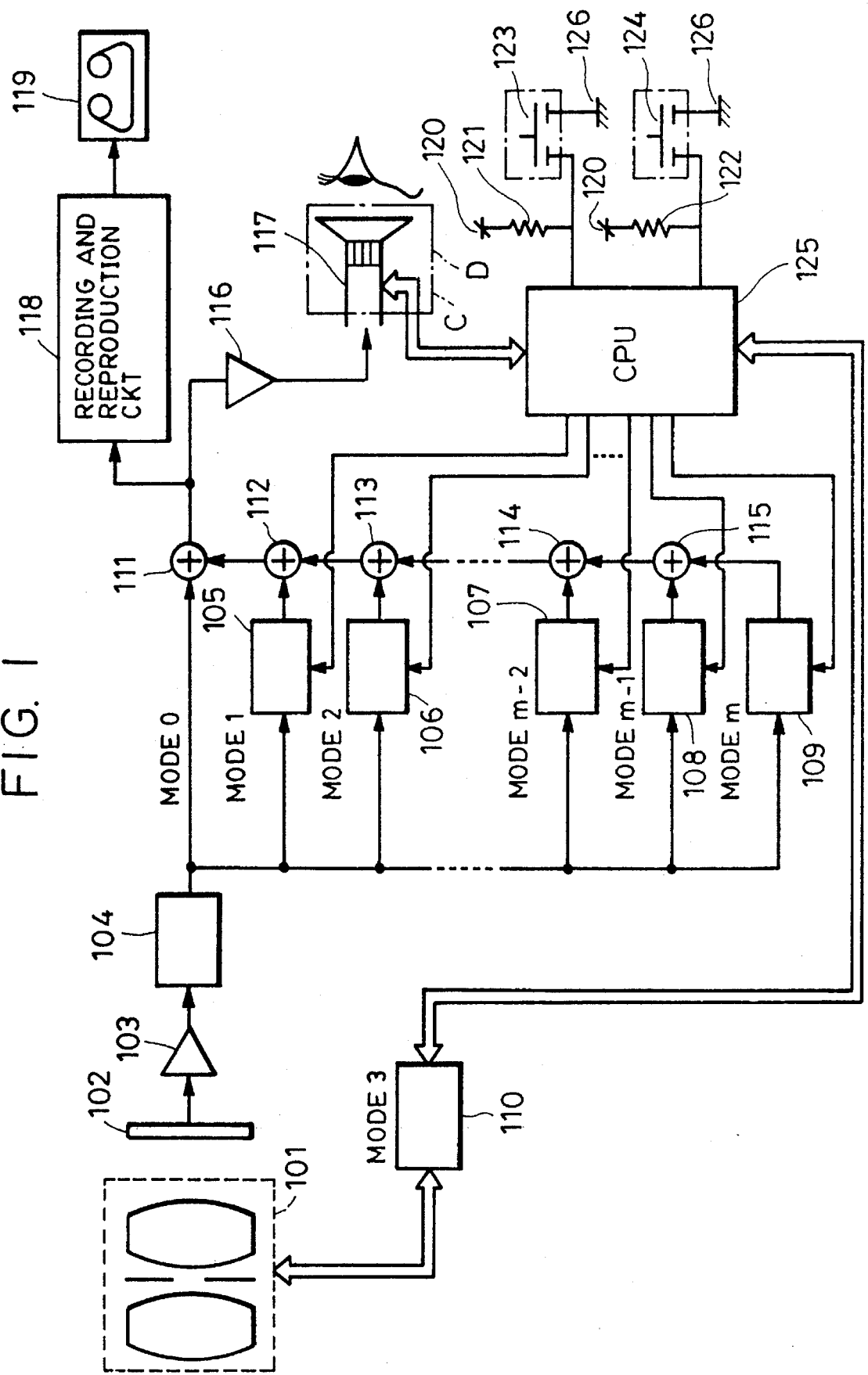
FIG. 1A is block diagram showing the construction of a video camera apparatus according to a first embodiment of the present invention.
Figure 2:
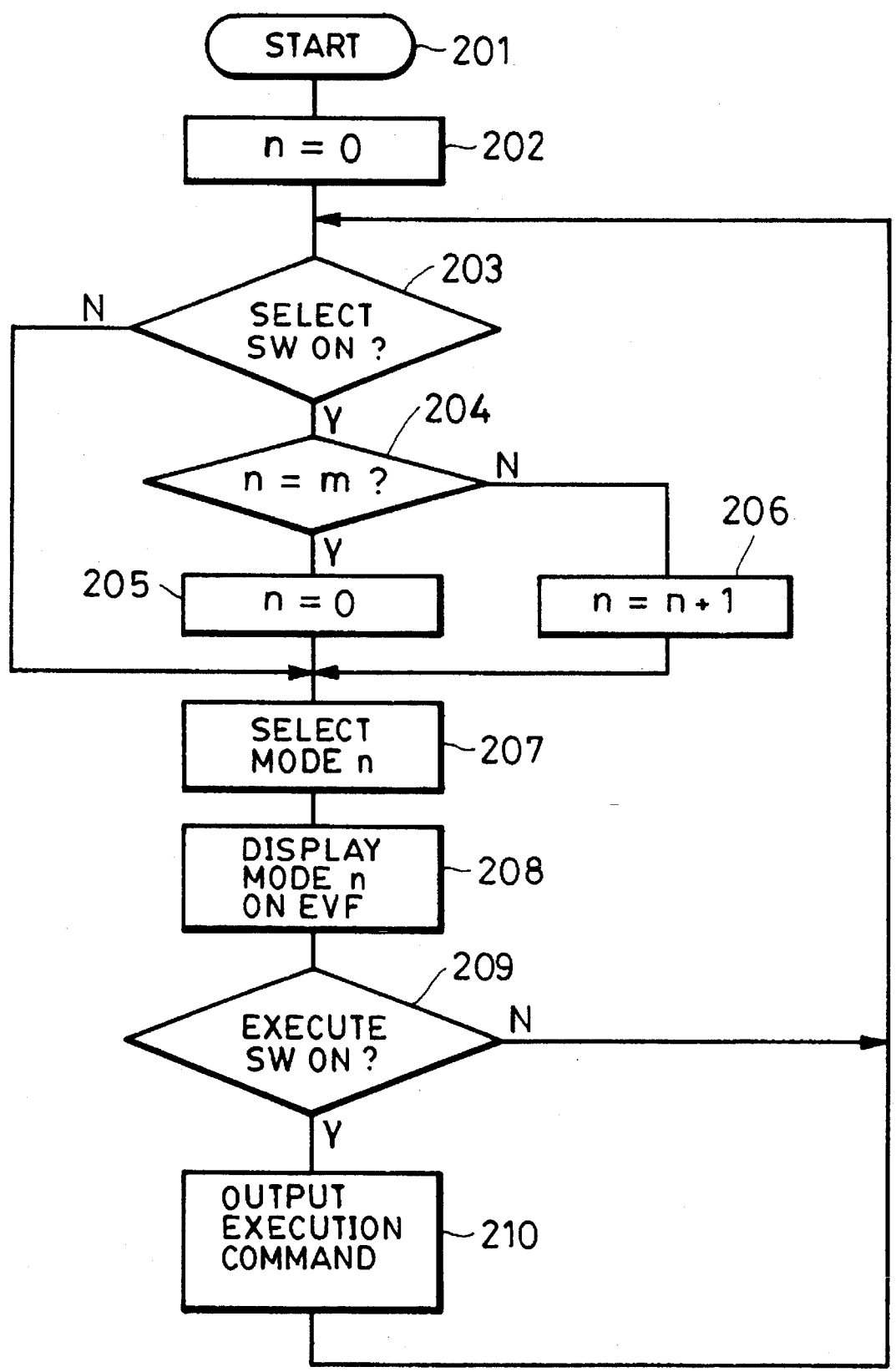
FIG. 2 is a flowchart showing control of the operation of the first embodiment.

FIG. 1 and FIG. 2 are a block diagram and a flowchart, respectively, illustrating a first embodiment of the video camera apparatus according to the present invention.

Referring to FIG. 1, a video camera apparatus includes: a lens unit 101 having various functions such as focus adjustment, diaphragm adjustment and magnification adjustment; an imaging device 102, such as a charge-coupled device (CCD), for performing photoelectric conversion of an image of a scene (whose picture is being taken) focussed by the lens unit 101 onto the imaging surface of the imaging device 102, and for outputting a corresponding imaging signal; an amplifier 103 for amplifying the imaging signal output from the imaging device 102 to a predetermined level; and a camera signal processing circuit 104 for subjecting the signal output from the amplifier 103 to a predetermined signal processing to thereby convert the signal into a corresponding television signal.

The video camera apparatus also includes: a plurality of picture effect circuits 105, 106, 107, 108 and 109 for producing various picture effects on the basis of the signal output from the camera signal processing circuit 104; and another picture effect circuit 110 for producing picture effects by moving a lens or diaphragm in the lens unit 101. A plurality of adders 112, 113, 114 and 115 are provided to superimpose picture effect signals from the individual picture effect circuits 105 to 109. The video camera apparatus has switches (SW), etc. (described later) which allow one of the functions of the picture effect signal circuits 105 to 110 to be selected, executed and cancelled, and allow the selected function to be altered.

An amplifier 116 is connected to the output of the camera signal processing circuit 104, and an electronic viewfinder (EVF) 117 is provided to display either a television signal output from the camera signal processing circuit 104 or a television signal reproduced by a video tape recorder (VTR) 119, and also to display information on the current situation of the selection and execution of the various functions, in other words, various modes. The VTR 119 is connected with a recording and reproduction circuit (CKT) 118 for converting a television signal output from the camera signal processing circuit 104 into a signal suitable for recording on a recording media such as a video tape. The VTR 119 is capable of recording the resultant television signal from the recording and reproduction circuit 118, and capable of reproducing the television signal recorded on the video tape or the like, and then supplying the reproduced television signal to the recording and reproduction circuit 118.

Resistors 121 and 122 are connected with power supply lines 120.

The video camera apparatus includes a switching device. In the example illustrated in FIG. 1, the switching device comprises a function selecting switch (hereinafter abbreviated to "the select switch") 123 for selecting a function from among the plurality of functions of the video camera apparatus, and a function executing switch (hereinafter abbreviated to "the execute switch") 124 for executing the particular function selected through the select switch 123. The select switch 123 and the execute switch 124 are grounded via grounding lines 126.

A system controller 125 for controlling the entire video camera apparatus consists of a central processing unit (CPU). The system controller 125 controls the picture-taking operation of the video camera, the recording of signals input from outside, the reproduction of recorded signals, and the execution and termination of, as well as the operations associated with, various functions. In relation to the function control, the system controller 125 controls the various functions on the basis of the operation of the select switch 123 and the execute switch 124, and includes selection cancelling means, for cancelling the selection of a function effected through the select switch 123, execution discontinuing means, for cancelling continuation of the execution of a function effected through the execute switch 124, and display means which, when the selection of a function or continuation of the execution of a function has been cancelled through the selection cancelling means or the execution discontinuing means, displays the current status of the function on the screen of the EVF 117 serving as a display device.

The video camera apparatus according to this embodiment, having the above-described construction, operates in accordance with a control program stored in the system controller 125 for controlling the various functions of the video camera apparatus. The operation will be described in detail with reference to the flowchart shown in FIG. 2.

As shown in FIG. 2, the control program includes the following procedures: Step 201 where the execution of the control program starts; Step 202 where a function number n is reset to zero, the function number n being one of the numbers 0, 1, 2, . . . m serially assigned to the plurality of functions, which can be selected through the select switch 123 in order to facilitate the control of the functions; Step 203 where a determination is made as to whether or not the select switch 123 has been closed; Step 204 where a determination is made whether or not the function number n is equal to "the total number m of the plurality of functions which can selected (hereinafter be referred to as "the selectable functions") by the procedure Step 203; Step 205 where the select switch 123 is reset by resetting the function number n to zero; Step 206 where the function number n is incremented by one; Step 207 where the mode n is selected (n being a number determined in Step 205 or 206); Step 208 where a representation of the selected mode n is displayed on the screen of the EVF 117; Step 209 where a determination is made as to whether or not the execute switch 124 has been operated so as to determine whether the execution of the mode selected in Step 207 has been instructed; and Step 210 where, if the execute switch 124 has been operated and an instruction to execute the function has been received, a command to execute the function is issued. Specifically, in Step 210, processing is performed to cause a particular function necessary to effect the mode n selected in Step 207 to be selected from among the functions of the picture effect circuits 105 to 110, and cause the pertinent circuit to operate.

The flow of these procedures is as follows: Referring to FIG. 2, when the execution of the program starts in Step 201, the function number n is reset to zero in Step 202. In Step 203, it is determined whether the select switch 123 has been operated or not.

If the select switch 123 has not been operated, Step 207 is executed, skipping the steps in between. If the select switch 123 has been operated, Step 204 is executed.

In Step 204, if the relationship n=m stands, this means that the last of the serially numbered functions was selected last time. In order to allow another selection, the select switch 123 is reset by establishing the relationship n=0, in Step 205. This enables a selecting operation to start from the first of the serially numbered functions.

If n=m does not stand, the relationship n=n+1 is established so that a subsequent function may be selected. In this way, each time the select switch 123 is depressed, the selected item is sequentially altered from one of the plurality (i.e., m) of selectable functions to another In Step 207, in accordance with the function number n determined in either Step 205 or Step 206, the function corresponding to the determined number is selected from among the plurality of selectable functions, that is, from among the plurality of picture effect circuits 105 to 110. Preparations are made to output a command in accordance with the selected function, and, in Step 208, a representation of the function selected in Step 207, that is, the mode n, is displayed on the screen of the EVF 117.

Subsequently, Step 209 is executed, in which the state of the execute switch 124 is checked. If the execute switch 124 is closed, Step 210 is executed so as to bring the picture effect circuit, for providing the selected function n, into an operating state. If the execute switch 124 is open, the program is again executed starting with Step 203, and the function n may be updated.

Therefore, if the function selecting switch 123 and the function executing switch 124 are disposed at positions at which these switches can be distinguished from each other, the following advantage is provided: each time the operator depresses the select switch, the function selected from among the plurality of selectable functions can be sequentially updated. When the execute switch is operated after the selected function has become the desired function, the desired function is actually brought into operation. During the selection of a function, since the function being selected is displayed on the screen of the electronic viewfinder, it is possible to prevent operation errors. Further, since the currently effected mode is always displayed on the screen of the electronic viewfinder, it is possible to perform various operations while the operator takes a picture with his eye kept on the electronic viewfinder In FIG. 1, each of the picture effect circuits 105 to 110 is a circuit for subjecting a picture signal to certain processing, and is adapted to superimpose the processed signal on the output of the camera signal processing circuit 104. The circuit 110 has the function of controlling the lens or the diaphragm in the lens unit 101. For instance, the circuit 110 functions to provide a focus fading for achieving an out-of-focus state from an in-focus state, or to provide a reverse adjustment through a reverse fading action. The other picture effect circuits may possibly have functions such as automatic fading (gradual increasing or decreasing of the level of the picture signal), wiping, scrolling, digital title recording, and image superimposing.

A second embodiment of the present invention will be described with reference to FIGS. 3 to 5.

Figure 3:
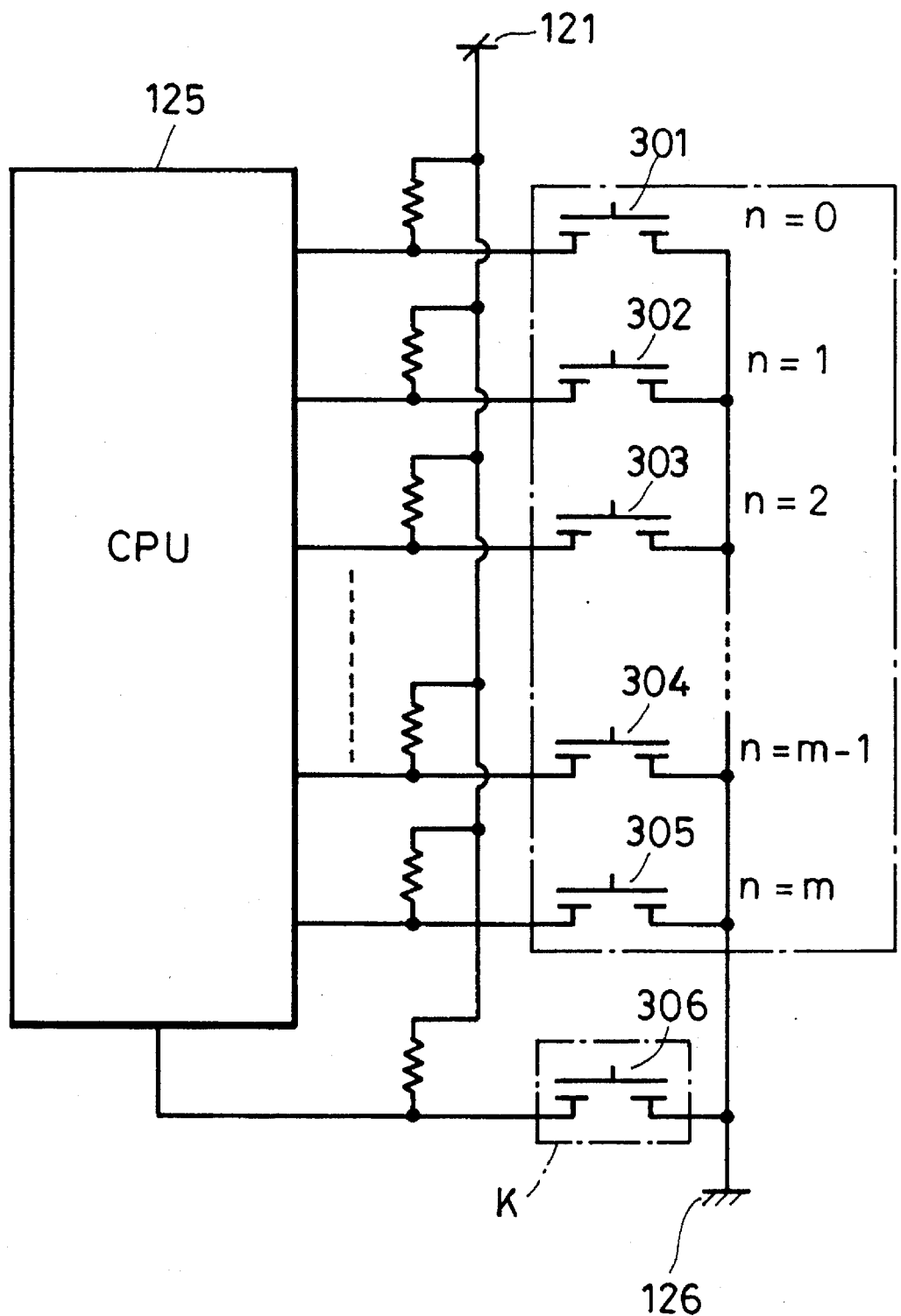
FIG. 3 is a circuit diagram showing the essential parts of a video camera apparatus according to a second embodiment of the present invention.

FIG. 3 shows, in a circuit diagram, a switching device of a second embodiment of the present invention. The second embodiment is distinguished from the first embodiment in that the function selecting switch 123 and the function executing switch 124 (both of the first embodiment) connected with the CPU 125 serving as the system controller, are respectively substituted by: function selecting means permitting a plurality of functions to be simultaneously selected, and comprising a group of function selecting switches 301 to 305; and a function executing switch 306. The other construction of the second embodiment is exactly the same as that of the first embodiment.

Referring to FIG. 3, the function selecting means comprises a group of function selecting switches 301 to 305 (arranged as described below), and is adapted to permit a plurality of functions to be selected from among all the functions offered by the apparatus. The function executing switch 306 permits a plurality of functions selected through some or all of the select switches 301 to 305 to be simultaneously executed.

The function selecting switches 301 to 305 (hereinafter abbreviated to "the select switches") and the execute switch 306 (hereinafter abbreviated to "the execute switch") are connected to a CPU 125 serving as the system controller. The CPU 125 includes selection cancelling means permitting the selections of a plurality of functions effected through some or all of the select switches 301 to 305 to be simultaneously cancelled, and execution cancelling means permitting continuations of the executions of a plurality of functions effected through the execute switch 306 to be simultaneously cancelled (these means will be described later in detail).

As shown in FIG. 3, the select switches 301 to 305 are provided in correspondence with each of the various functions, i.e., various modes, offered by the apparatus, and a function number n (n=1, 2, ... m) is assigned to each of the functions or modes. This arrangement enables a plurality of functions among the plurality functions to be simultaneously selected.

Control performed in this embodiment will be described with reference to the flowchart shown in FIG. 4.

Figure 4:
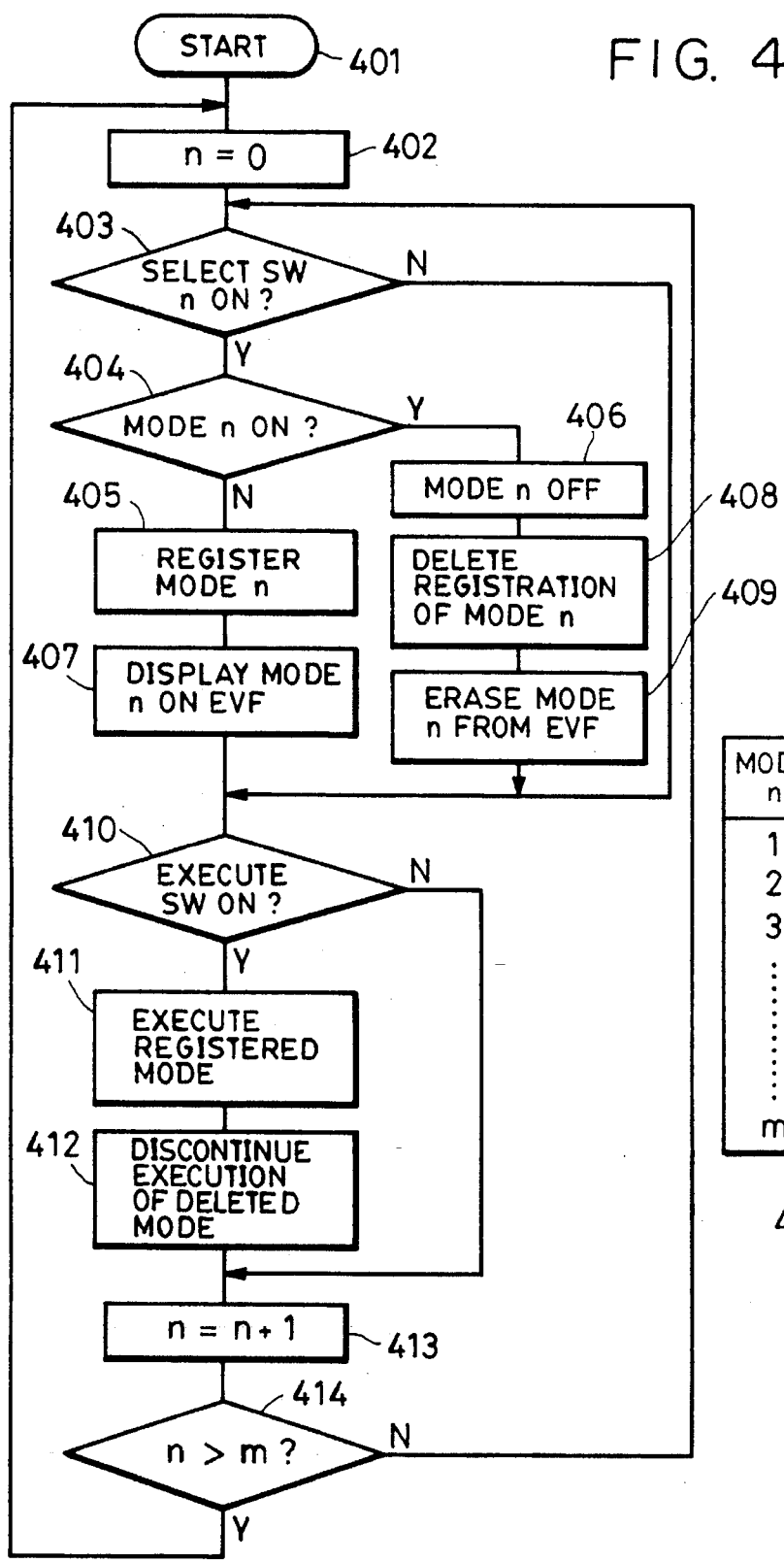
FIGS. 4 is a flowchart showing control of the operation of the second embodiment
Figure 5:
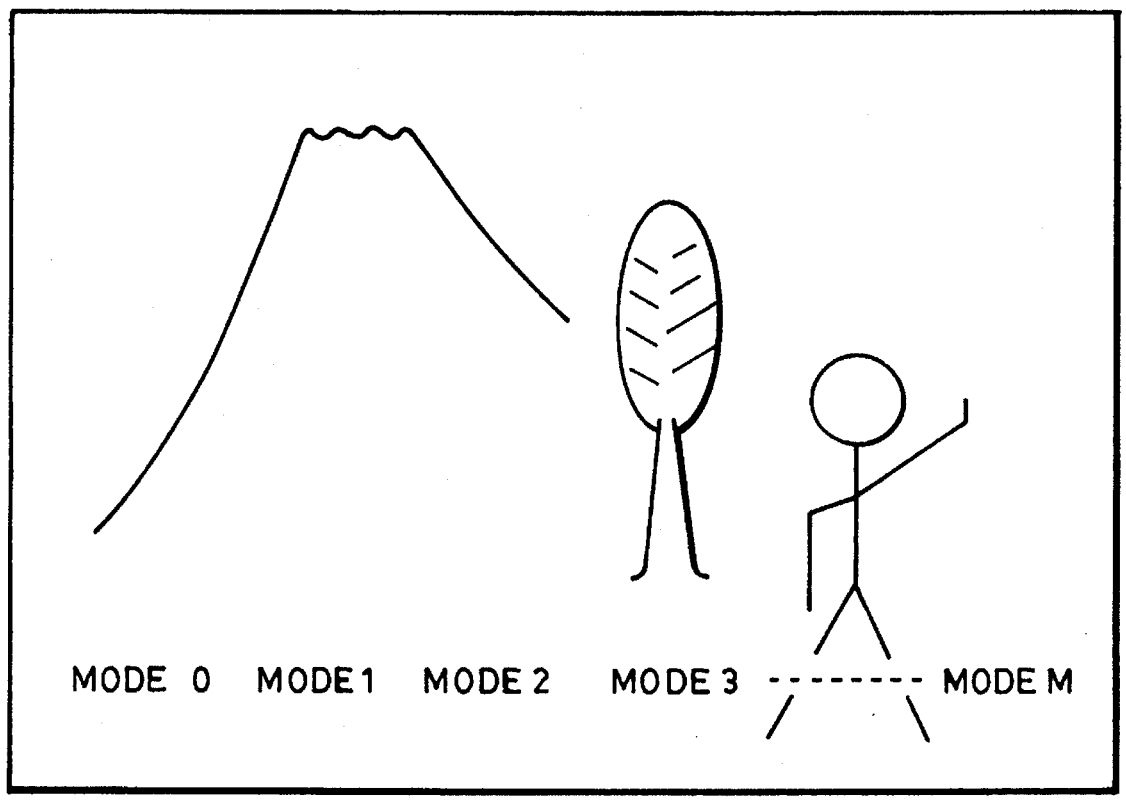
FIG. 5 is a diagram showing an example of a display on an electronic viewfinder in the second embodiment.

Referring to FIG. 4, the execution of a control program starts, in Step 401. In Step 402, the function number n is reset to zero. In Step 403, a determination is made as to whether or not a particular select switch corresponding to a particular function number n (n having a varying value) is closed, that is, as to whether each of the select switches 301 to 305 is closed. This determination may be made in various possible manners. In the illustrated example, the value of the function number n is repeatedly incremented by one, and a determination is made with respect to each of the select switches corresponding to such an incremented function number n. When executing Step 403 following the execution of Step 402, the determination is made with respect to the select switch 301 corresponding to the function nusuper n=0. Thereafter, switches 302 et seq. are subjected to the determination. When the function number n reaches m, the function number n is again reset to 0, and the above procedures are repeated.

If, in Step 403, it is determined that a particular select switch corresponding to a particular function number n is closed, Step 404 is executed. If not, Step 410 is executed.

In Step 404, a determination is made as to whether or not the function, i.e., the mode, corresponding to the particular select switch n which has been determined to be closed in Step 403, has already been entered. If this particular mode has not been entered, Step 405 is executed, in which the mode number n corresponding to the particular select switch is registered as a mode to be executed. Subsequently, Step 407 is executed. In Step 407, a representation of the selected mode, which is to be executed, is displayed on the screen of the electronic viewfinder (EVF) 117. Thereafter, Step 410 is executed.

On the other hand, if, in Step 404, it is determined that the function corresponding to the particular select switch n has already been entered, that is, if a mode which is currently being executed is again selected, Step 406 is executed. In Step 406, the execution of the particular mode n is discontinued, and, in Step 408, the registration of the mode n for the execution thereof is deleted. Further, in Step 409, the representation of the mode n whose registration has been deleted, is erased from the screen of the EVF 117. Then, Step 410 is executed.

In Step 410, the state of the execute switch 306 is checked. If the execute switch 306 is turned on, Step 411 is executed. In Step 411, all the modes which have been registered as modes to be executed, are executed. Subsequently, in Step 412, the executions of all the modes whose registrations have been deleted, are discontinued. Then, Step 413 is executed.

If, in Step 410, it is determined that the execute switch 306 is not turned on, Step 413 is executed, skipping Step 411 and Step 412.

In Step 413, the function number n is incremented by one. In the subsequent step 414, a determination is made as to whether or not the incremented function number n is greater than the total number m of all the modes offered by the apparatus. If, in Step 414, the function number n is determined to be greater than the total number m of the modes, this means that a check of all the selectable functions has been completed. Hence, the above procedures are repeated, starting with Step 402.

If, in Step 414, it is determined that the function number n is below the total number m of the possible modes, Step 403 et seq. are again executed with respect to another mode having a function number n=n+1.

In FIG. 4, denoted by reference numeral 415 is an example of a memory for storing data on the various modes. A plurality of areas are sequentially provided in correspondence with the mode n=0 to the mode n=m. The areas corresponding to those modes to be executed, which have been selected through some of the select switches 301 to 305, and which have been selected in the procedure Step 403, store data "1" indicating registrations for execution. The areas corresponding to those modes whose registrations have been deleted in the procedure Step 408. store data "0" indicating the deletions.

When, as in this embodiment, a plurality of function selecting switches 301 to 305 are provided, an arrangement such as above makes it possible to simultaneously select a plurality of functions from among all the selectable functions, and to simultaneously execute the plurality of selected functions.

That is, means (such as the memory 415 illustrated in FIG. 4) for storing the current status of each of all the possible modes with respect to registration and deletion of registration of the mode is provided so that the registered modes will be simultaneously entered when the execute switch 306 is turned on.

Further, since a plurality of functions can be simultaneously executed, it is necessary that, in such cases, a plurality of corresponding representations be displayed on the screen of the EVF 117. For this purpose, as shown in FIG. 5, the screen of the EVF 117 has a plurality of areas on which a plurality of representations of various functions may be displayed. This arrangement enables display and erasure to be positively effected in accordance with the registered or registration-deleted status of each possible mode.

When the execute switch 306 is operated, those modes registered in the memory 145 are executed, and those modes whose registrations have been deleted, are discontinued.

Thus, while the above-described procedures are repeated, any registration or deletion of a function takes place only when the select switch has been operated, and, when the execute switch is operated, a plurality of modes may be simultaneously entered in accordance with the data on all the possible modes indicating their registered or registration-deleted status.

The display on the screen on the EVF 117 enables the operator to confirm the registered and registration-deleted status of each mode, and to operate any of the select switches 301 to 305 and the execute switch 306 while confirming the status. Accordingly, it is possible to prevent erroneous operations, and to perform various operations of the video camera apparatus without interrupting a picture-taking operation. Thus, the operability of the apparatus can be greatly improved.

Another construction of a switching device, which can be used in the first and second embodiments, will be described with reference to FIG. 6.

Figure 6:
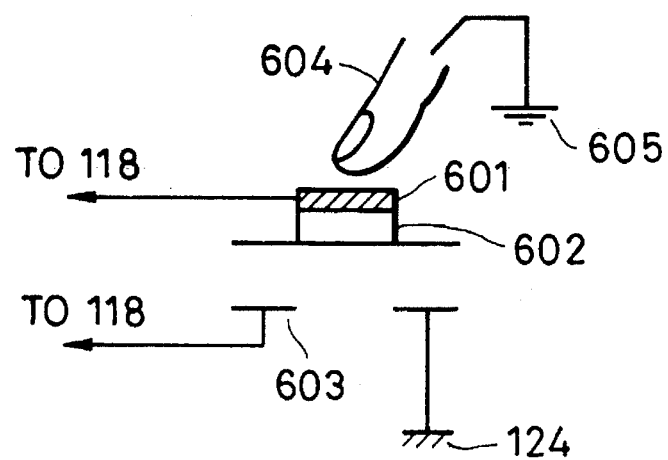
FIG. 6 is a diagram showing another construction of a switching device applicable to the first and second embodiments.

Referring to FIG. 6, the switching device includes: a contact detector (hereinafter referred to as "the display switch") 601 in which a change in the electrical condition can be caused by a contact with a part of the human body or the like; an insulator 602; and a terminal 603 of a pull-up switch (hereinafter referred to as "the register switch"). A common example of a part of the human body is a finger 604, and the human body has a potential 605.

A third embodiment will be described, in which the operation of the switching device shown in FIG. 6 is controlled as the procedures of a control program stored in the CPU 125 (shown in FIG. 1) are executed in the manner shown in FIG. 7.

Figure 7:
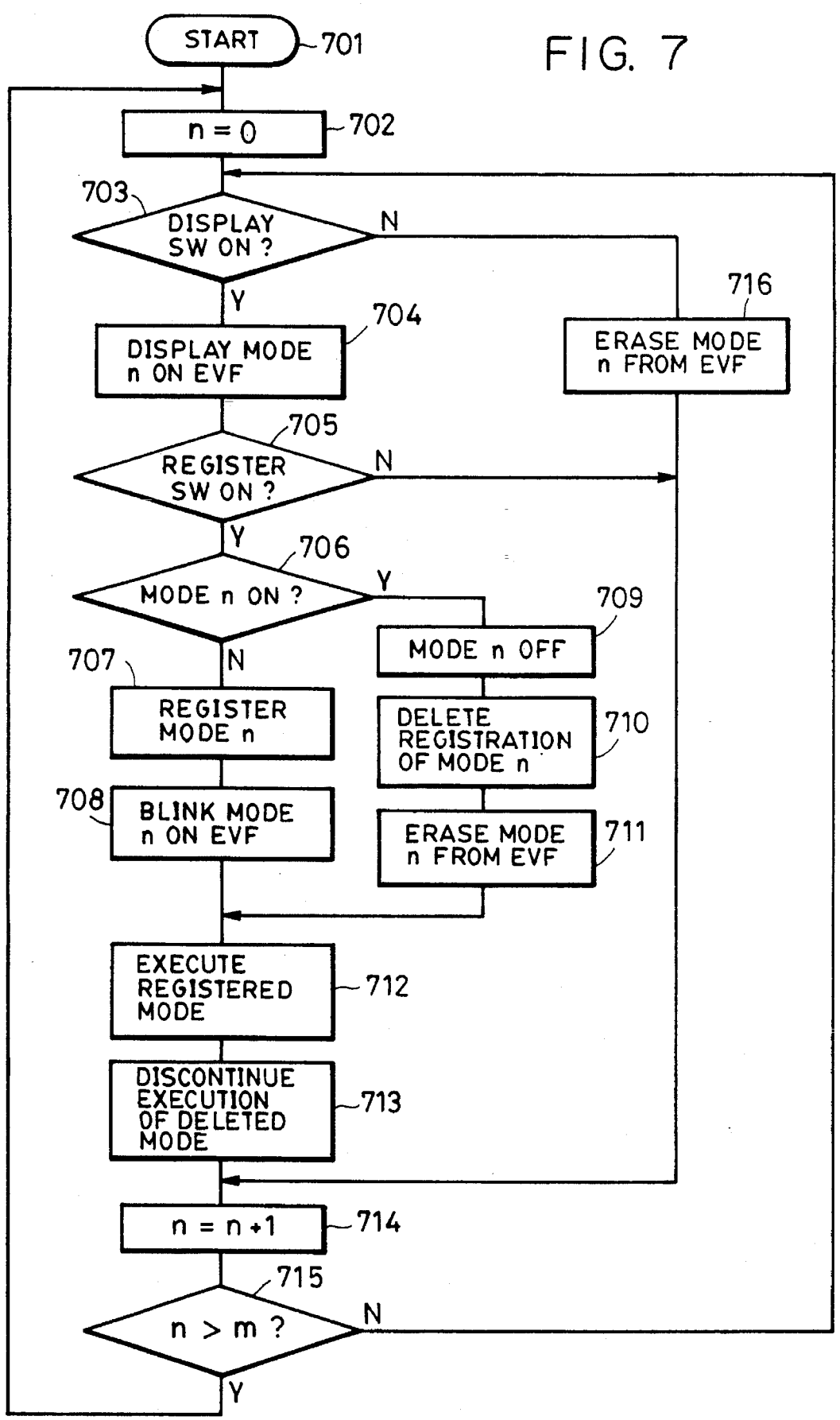
FIG. 7 is a flowchart showing control of the operation of the switching device shown in FIG. 6.

Referring to FIG. 7, the execution of the control program starts, in Step 701. In Step 702, the function number n is reset to zero. In Step 703, a determination is made as to whether the display switch 601 (shown in FIG. 6) is turned on due to a contact with the operator's finger 604. If, in Step 703, it is determined that the display switch 601 is not turned on, Step 716 is executed, in which the representation of a particular mode n is erased from the screen of the EVF 117, the particular mode n being the mode 0 when Step 703 is executed following the execution of Step 702. The erasure is followed by the execution of Step 714 where the function number n is incremented by one. Then, Step 715 is executed. Thereafter, with respect to a subsequent function, determinations concerning display and execution are made, depending on the state of the switching device.

On the other hand, if, in Step 703, it is determined that the display switch 601 is turned on due to a contact with the finger 604, Step 704 is executed. In Step 704, a representation of the particular mode n is displayed on the screen of the EVF 117.

The switching device shown in FIG. 6 is arranged such that, when the display switch 601 is touched with a finger, and then strongly depressed, the register switch is closed. If, in Step 705, it is determined that the register switch is not closed, the particular mode n is merely displayed on the screen of the EVF 117, in Step 704, and the mode n is not executed.

If, in Step 705, it is determined that the register switch has been depressed, Step 706 is executed, in which a determination is made as to whether the particular mode n has already been entered. If the mode n is currently being executed, Steps 709, Step 710 and Step 711 are sequentially executed, as in the second embodiment, so that the particular mode n is discontinued, the registration of the mode n is deleted, and the representation of the mode n on the screen of the EVF 117 is erased.

On the other hand, if the particular mode n is not currently being executed, Step 707 is executed, in which the mode n is registered for its execution. Then, in Step 708, a representation of the registered mode n is displayed and blinked on the screen of the EVF 117.

In Step 712, only the registered mode(s) are executed, and, in Step 713, the non-registered mode(s) are discontinued. These procedures are the same as those in the second embodiment.

After the execution of Step 714 and Step 715, whereby the function number n is updated until n>m, the above procedures are repeated.

As described above, with the construction illustrated in FIG. 6, since the execute switch used in the previous embodiments need not be provided, the operation of the switching device can be simplified while increasing the degree of reliability.

Further, the representation of a mode may be displayed in different manners in accordance with the status of the mode. For instance, a representation of a mode, which has been registered, may be lit on, whereas that of a mode being executed may be blinked. This makes it possible to eliminate the risk that a mode being effected may be erroneously discontinued.

Figure 8:
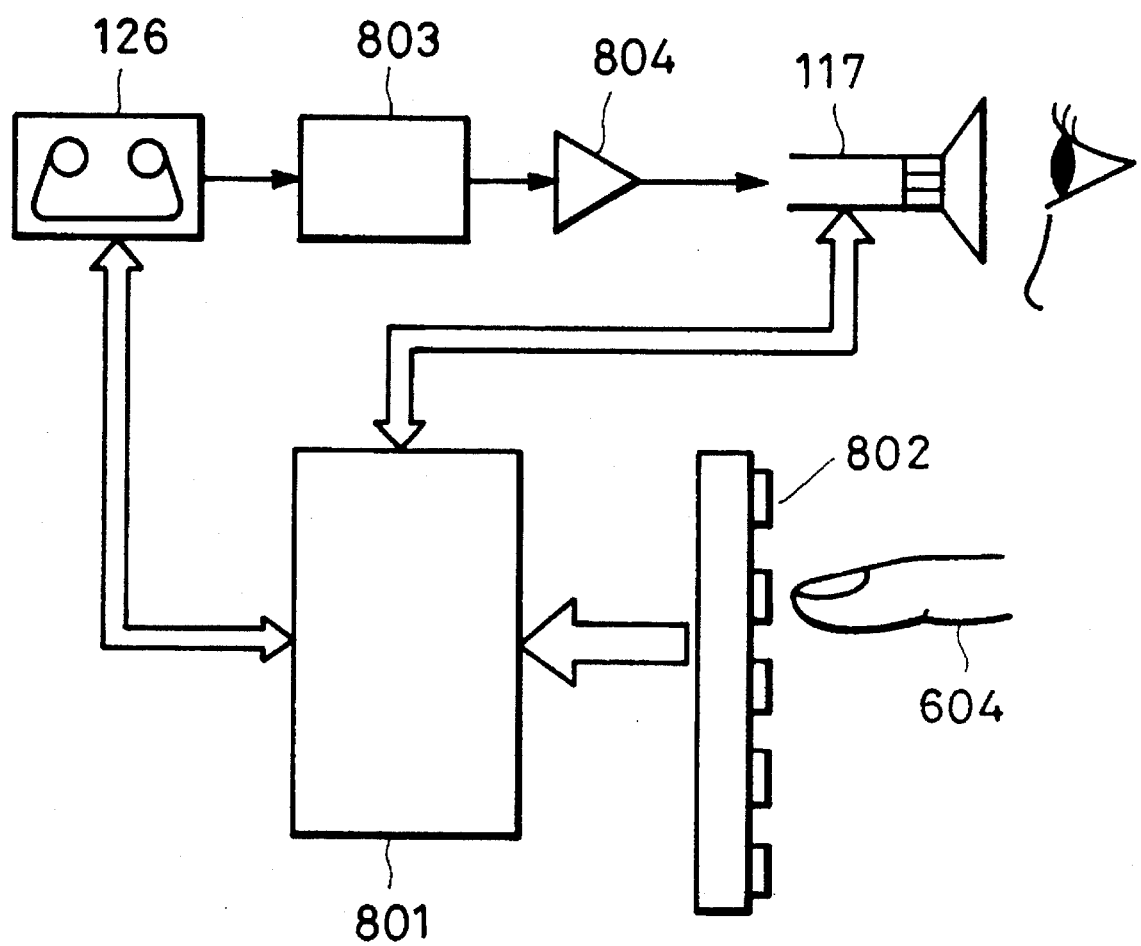
FIG. 8 is a block diagram showing the construction of an application of the first or second embodiment to a VTR.

A piece of VTR equipment to which a video camera apparatus according to a first or second embodiment of the present invention is applied, will be described with reference to FIG. 8. In FIG. 8, those constituent blocks equivalent in function to some of the above-described blocks are denoted by the same reference numerals.

The VTR equipment includes a VTR 126, a microcomputer (CPU) 801 for controlling the entire system, a switch board 802, a circuit 803 for processing a signal output from the VTR 126, and an amplifier 804.

The CPU 801 stores a program which is based on the same principles as those stored in the CPU 125 of in the previous embodiments. Therefore, the description of the program will be omitted.

The operation of the VTR equipment can be outlined as follows. One or more control functions of the VTR 126 are selected through switch(es) of the switch board 802, and the selected mode(s) are executed after the representations of the modes are displayed on the screen of the EVF 117, and confirmed by the operator.

Thus, switch(es) can be selected by the operator while he confirms the picture being output by the VTR 126 through the viewfinder 117, and keeps his eye on the viewfinder. Accordingly, monitoring during an editing operation, or searching at the start of a recording operation can be efficiently performed.

As has been described above, according to the present invention, selection and execution of various functions are independently effected through a switching device, and the current situation of such selection and execution determined by the position of the switching device is displayed. With the present invention, therefore, selection and execution of various functions can be performed with high reliability without any particular need for the operator to check the position of the switching device.

What is claimed is:

1. A video camera apparatus having a plurality of functions, comprising:
   (a) function selecting means for performing a selection operation to choose at least two functions to be executed from the plurality of functions;
   (b) common function executing means for executing the at least two functions selected through said function selecting means;
   (c) an image monitor for displaying a representation of the at least two functions selected as well as a picture being taken by said video camera apparatus; and
   (d) control means for controlling the display of said image monitor to indicate the at least two functions selected through said function selecting means on said image monitor prior to the execution of the at least two functions through said function executing means.

2. A video camera apparatus according to claim 1, wherein said control means controls the display of the at least two functions being executed through said function executing means.

3. A video camera apparatus according to claim 2, wherein said image monitor comprises an electronic viewfinder.

4. A video camera apparatus according to claim 1, wherein said control means comprises selection cancelling means for cancelling the at least two functions to be executed of the plurality of functions selected through said function selecting means.

5. A video camera apparatus according to claim 4, wherein said control means comprises execution discontinuing means for cancelling the at least one function being executed through said function executing means.

6. A video camera apparatus according to claim 1, wherein said function selecting means changes the at least two functions chosen by the selection operation by repeating the selection operation.

7. An image information processing apparatus having a plurality of functions, comprising:
   (a) function selecting means for performing a selection operation to choose at least two functions to be executed from the plurality of functions;
   (b) memory means for storing data corresponding to the at least two functions selected through said function selecting means;
   (c) common function executing means for executing the at least two functions selected based on the data stored by said memory means;
   (d) an image monitor for displaying a representation of the at least two functions selected based on the data stored by said memory means; and
   (e) control means for controlling the display of said image monitor to indicate the at least two functions selected through said function selecting means on said image monitor prior to the execution of the at least two functions through said function executing means.

8. An apparatus according to claim 7, wherein said function executing means is capable of executing the at least two functions based on the data stored by said memory means at a same time.

9. An apparatus according to claim 8, wherein said control means comprises selection cancelling means for selectively cancelling the data stored said memory means.

10. An apparatus according to claim 9, wherein said control means comprises execution discontinuing means for discontinuing the at least two functions based on the data cancelled by said selection cancelling means.

11. A video camera apparatus having a plurality of functions, comprising:
   (a) function indication means for indicating a subset of functions including at least two functions, selected by performing a selection operation from the plurality of functions;
   (b) common function executing means for simultaneously executing the subset of functions including at least two functions, indicated by said function indication means;
   (c) an image monitor for displaying a representation of the indicated subset of functions including at least two functions as well as a picture being taken by said video camera apparatus; and
   (d) control means for controlling said image monitor to display a representation of the indicated subset of functions including at least two functions prior to the execution of the subset of functions including at least two functions through said function executing means.

\* \* \* \* \*

UNITED STATES PATENT AND TRADEMARK OFFICE
CERTIFICATE OF CORRECTION

PATENT NO. : 5,488,414
DATED : January 30, 1996
INVENTOR(S) : Hirasawa, et. al.

It is certified that error appears in the above-indentified patent and that said Letters Patent is hereby corrected as shown below:

Title page,

[56] FOREIGN PATENT DOCUMENTS

```
"2048647  2/1990  Japan
 3108879  5/1991  Japan
 4023574  1/1992  Japan" should read
--2-048647  2/1990  Japan
  3-108879  5/1991  Japan
  4-023574  1/1992  Japan--; and
--4-128464  1/1992  Japan-- should be inserted.
```

COLUMN 4

Line 23, "selected" should read --be selected--;
Line 23, "be referred" should read --referred--; and
Line 59, "another" should read --another.--.

COLUMN 5

Line 25, "viewfinder" should read --viewfinder.--.

COLUMN 6

Line 28, "nusupr" should read --number--.

UNITED STATES PATENT AND TRADEMARK OFFICE
CERTIFICATE OF CORRECTION

PATENT NO. : 5,488,414 Page 2 of 2
DATED : January 30, 1996
INVENTOR(S) : HIRASAWA, ET AL.

It is certified that error appears in the above-indentified patent and that said Letters Patent is hereby corrected as shown below:

COLUMN 10

Line 8, "one function" should read --two functions--; and
Line 41, "said" should read --in said--.

Signed and Sealed this

Second Day of July, 1996

*Attest:*

BRUCE LEHMAN

*Attesting Officer*   Commissioner of Patents and Trademarks